Patented July 24, 1951

2,561,553

UNITED STATES PATENT OFFICE 2,561,553

PROCESS FOR THE MANUFACTURE OF 8-HYDROXY QUINOLINE

Walter R. Ashford, Guelph, Ontario, Canada, assignor to United States Rubber Company, New York, N. Y., a corporation of New Jersey No Drawing. Application September 14, 1948, Serial No. 49,302

10 Claims. (Cl. 260—289)

This invention relates to a process for the manufacture of 8-hydroxy quinoline by means of the Skraup reaction and particularly to such a method which is adapted to be used on a commercial scale. Since the date of its discovery, 1880, the Skraup reaction has been the subject of much research, the objects of which were to decrease the violence of the reaction and increase the yields. The principal object of the present invention is likewise to control the violence of the reaction in an economical manner and at the same time to produce high yields of 8-hydroxy quinoline so that the process is commercially attractive.

As originally carried out by Skraup for the preparation of quinoline, the reaction consisted in heating together one part by weight of aniline with one and one-half parts by weight of sulfuric acid and one or more parts by weight of glycerol to 180–190° C. The reaction was exceedingly violent in the initial stages and produced a small yield of quinoline. The addition of nitrobenzene to the reaction mixture raised the yield of quinoline to about 50% based on the aniline used. Subsequent modifications in the reaction have replaced the nitrobenzene by inorganic oxidizing agents such as arsenic acid and calcined ferric oxide. Recently the nitrobenzene has been replaced by a small quantity of iodine. The violence of the reaction has been moderated by the use of such reagents as acetic acid and boric acid, both of which are believed to form a compound with the glycerol thereby controlling the amount of free glycerol present in the reaction mixture.

However, the original Skraup reaction and all subsequent modifications thereof have not succeeded in eliminating economically the violence of the reaction, while maintaining high yields. In addition to the use of the above reagents, recourse has been had to various methods of bringing the reactants together. For example, the sulfuric acid has been added portionwise to the other admixed reactants. Likewise the amine has been added portionwise. However, even with these modifications in procedure the violence of the reaction was not adequately controlled nor was the yield substantially improved.

I have now found that 8-hydroxy quinoline can be prepared in a highly improved manner which provides complete control of the vigour of the reaction and results in the attainment of high yields by preliminarily forming a mixture of glycerol, concentrated sulfuric acid and ortho-aminophenol at a temperature of not over 120° C. and gradually adding such a mixture while at a temperature of not over 120° C. to a mixture of ortho-nitrophenol and an inorganic oxygen carrier in a reaction zone. My invention is based upon the discovery that the glycerol, sulfuric acid and ortho-aminophenol can be mixed without chemical reaction taking place provided the temperature is not allowed to rise above 120° C. For example, these reactants may be mixed together in any suitable manner with control of the temperature so that it does not rise above 120° C. and the resulting mixture may then be maintained at any convenient temperature up to 120° C., all without chemical reaction therebetween taking place. This mixture may conveniently be maintained at a temperature at which it is fluid, say from 60° to 90° C., and then added in portions to the reaction vessel in which the mixture of ortho-nitrophenol and the oxygen carrier have been placed, the reaction zone being warmed to a suitable temperature, say 135° to 140° C., at which the Skraup reaction will take place. When the first portion has reacted as is indicated by subsidence of the vigour of the reaction, a second portion may be added and thereafter subsequent portions until the entire mixture of glycerol, sulfuric acid and ortho-aminophenol has been added to the reaction vessel, each portion having been allowed to react before adding the next portion. With such a procedure there is no tendency for a violent reaction to take place; in fact, heat must be applied continually to maintain the temperature of reaction which, preferably ranges from 135° to 140° C. With the foregoing procedure it is also noteworthy that the reaction proceeds at a lower temperature than when any of the other known methods of conducting reaction are employed. This provides for a smoother reaction and undoubtedly is one of the reasons for the greater yields of 8-hydroxy quinoline made possible by the process of my invention.

Following the addition of all of the mixture of glycerol, sulfuric acid and ortho-aminophenol to the reaction vessel, the reaction mixture may be heated and stirred under reflux, preferably at a temperature not exceeding 140° C., until the reaction is substantially complete, typically for from 4 to 5 hours. The end of the reaction is indicated when no more ortho-nitrophenol is visible in the condensate. During the period of refluxing following addition of the aforesaid mixture, the temperature of the mixture under reflux will drop, typically from 138° C. to about 129–130° C., due primarily to the formation of water in the reaction.

Following the reaction, the 8-hydroxy quinoline is recovered from the reaction mixture in any suitable manner known to the art, preferably by steam distillation or by precipitation as the copper salt. The copper salt of 8-hydroxy quinoline has assumed great commercial importance as a fungicide particularly for the mildew proofing of cotton fabric.

By employing the process of my invention it is possible to obtain much better yields of 8-hydroxy quinoline than when employing any previously known method. Yields of 8-hydroxy quinoline obtained by the practice of my invention, based upon the ortho-aminophenol used, typically run from 40 to 50% greater than those obtainable by any previously known method. In addition my invention makes it possible to use just sufficient ortho-nitrophenol so that all of it is consumed in the reaction and there is no need for the recovery of an unused portion. In this way the treatment of the reaction mixture resulting from the practice of my invention is simplified considerably. A third and very important advantage of my invention is the fact that there is no tendency for the reaction to get out of control. Thus the danger of the violent explosion of the Skraup reaction carried out on a large commercial scale is completely eliminated by the present invention. The great tendency of the Skraup reaction to become explosively violent heretofore prevented its use on a large commercial scale.

The relative proportions of the reactants employed in the practice of my invention may vary within wide limits. I prefer to use such an amount of glycerol that the mole ratio thereof to ortho-aminophenol ranges between 2.75:1 and 3.5:1. Variation of this mole ratio between these limits does not appreciably change the yield of 8-hydroxy quinoline. However, the amount of glycerol may be in excess of 3.5 moles per mole of ortho-aminophenol; thus it can range as high as six moles per mole of ortho-aminophenol. I prefer to employ an amount of ortho-nitrophenol which is the minimum quantity consistent with good yields and which will be entirely consumed in the reaction so that recovery of unused ortho-nitrophenol is unnecessary. For a mole ratio of glycerol to ortho-aminophenol ranging between 2.75:1 and 3.5:1, I prefer to use ortho-nitrophenol in an amount equivalent to substantially 0.5 mole thereof, say 0.4 to 0.6 mole, per mole of ortho-aminophenol.

The amount of sulfuric acid employed may be that commonly employed in carrying out the Skraup reaction, typically from 1 to 10 moles thereof per mole of ortho-aminophenol and often from 2 to 4 moles per mole of ortho-aminophenol. The sulfuric acid used should be concentrated, i. e., should be substantially 100% $H_2SO_4$ and should not contain more than 5% by weight of water, i. e., should contain from 95% to 100% $H_2SO_4$.

As the inorganic oxygen carrier used in practicing the present invention, I prefer to employ ferrous sulfate. I may employ ferrous sulfate as such or I may form it in situ as by the employment of iron compounds which with the concentrated sulfuric acid employed will form ferrous sulfate under the conditions prevailing. Instead of ferrous sulfate I may use any other inorganic oxygen carrier, such as nickel sulfate, cobalt sulfate or any other cobalt salt, etc. Instead of using nickel sulfate I may use elementary nickel or compounds of nickel which form nickel sulfate in situ.

The inorganic oxygen carrier used in the practice of my invention is preferably a compound of a metal selected from the group consisting of iron, cobalt and nickel which compound is soluble in the reaction mixture. The sulfates of iron, cobalt and nickel, especially when in a lower state of valence, i. e., ferrous sulfate, cobaltous sulfate and nickel sulfate, are particularly suitable. As indicated above, I may form the inorganic oxygen carrier in situ for example by using elementary iron, cobalt or nickel or a compound thereof, e. g., the oxide or carbonate, which is capable of reacting with the sulfuric acid to give the sulfate. Iron, nickel and cobalt form a recognized chemical group, being the transition elements found in group VIII of the first long period of Mendelejeff's Periodic Table. The oxygen carrier appears to function in a catalytic role.

The amount of the inorganic oxygen carrier employed need not be large. For example, I have obtained excellent results using ferrous sulfate in an amount equal to approximately 10 grams per gram molecular weight of ortho-aminophenol. The amount of ferrous sulfate may conveniently vary from this amount, say from 5 to 20 grams thereof per gram molecular weight of the ortho-aminophenol. In general the amount of the inorganic oxygen carrier or catalyst employed will range from 5 to 20% by weight based on the weight of ortho-aminophenol taken.

A preferred method of effecting intermixture of the glycerol, concentrated sulfuric acid and ortho-aminophenol prior to the reaction involves adding the ortho-aminophenol gradually to the concentrated sulfuric acid with cooling so that the temperature is from 70° to 80° C. and the mixture is quite fluid, then adding to the resulting mixture the glycerol in portions with cooling so that the temperature is within the range of 70° to 80° C. This mixture will remain quite fluid and transferable if kept at from 70° to 80° C.

The other two reactants, namely ortho-nitrophenol and the oxygen carrier, typically ferrous sulfate, are placed in the reaction vessel before being treated with a portion of the preliminarily prepared mixture.

As stated above, the temperature of the glycerol-sulfuric acid-ortho-aminophenol mixture can be raised to 120° C. without reaction proceeding. I prefer to raise the temperature of the ortho-nitrophenol-ferrous sulfate mixture in the reaction zone to from 100° to 120° C. bfeore addition of the first portion of the glycerol-sulfuric acid-ortho-aminophenol mixture. This mixture is added gradually, typically portionwise, at such a rate that the temperature in the reaction zone does not exceed 140° C. and preferably is between 135° C. and 140° C., during this addition. The addition is carried out in such manner that the vigour of the reaction produced by each portion has subsided before the next portion is added. By preliminarily mixing the glycerol, sulfuric acid and ortho-aminophenol in the manner described above, there is, however, great freedom of action in carrying out the addition because the vigour of the reaction produced by even large portions of the glycerol-sulfuric acid-ortho-aminophenol mixture is not great and there is little danger of the violence of the usual Skraup reaction. In fact the principal feature of my invention is the discovery that pre-mixing the glycerol, sulfuric acid and ortho-aminophenol at a convenient temperature of not over 120° C. moderates the subsequent reaction. However, a safe rule for commercial practice would be to add the glycerol-sulfuric acid-ortho-aminophenol mixture in about 10 equal portions.

It is preferable to stir the reaction mixture throughout the addition and reaction in order to obtain equal distribution of the heat of reaction. However, stirring is not absolutely essential and in some cases may be dispensed with.

The following examples illustrate preferred procedures for the preparation of 8-hydroxy quinoline in accordance with my invention.

Example I o-Aminophenol (112.6 g.) is dissolved in concentrated sulfuric acid (169 cc.) with agitation and cooling so that the temperature does not rise above 70–80° C. To this mixture is then added glycerol, U. S. P. (286.8 g.) in portions with continued agitation and cooling so that the temperature does not rise above 70–80° and so that the mixture remains fluid. The entire mixture is then kept at 80–100° C. as by a steam bath so that it is always in the fluid state and readily transferable to the reaction vessel.

The reaction vessel is charged with o-nitrophenol (72.6 g.) and ferrous sulfate $$(FeSO_4 \cdot 7H_2O)$$

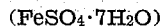

(10 g.) and the mixture warmed to 100–120° C. while stirring.

The glycerol-sulfuric acid-o-aminophenol mixture described above is now added in about 10 portions to the reaction vessel containing the o-nitrophenol and ferrous sulfate. Following each addition the temperature is raised to 135–140° and maintained there until reaction is complete. This is evidenced by a cessation of bubbling of the reaction mixture and requires 10–15 minutes. When all of the glycerol-sulfuric acid-o-aminophenol mixture has been added to the reaction vessel, the entire mixture is stirred under reflux for 4–5 hr. at first at a temperature not exceeding 140° and later, as the reaction proceeds, at the maximum temperature of gentle reflux. Toward the end of the reaction this temperature will subside to 129–131° due to the formation of water in the reaction mixture. The end of the reaction is indicated by the disappearance of the o-nitrophenol from the reflux liquors. Following the reaction, the mixture is allowed to cool to room temperature.

The 8-hydroxy quinoline can be isolated by various means but the preferred methods are by steam distillation or by precipitation as a metallic salt, e. g. copper. For separation by steam distillation, the reaction mixture is neutralized with 50% sodium hydroxide solution (250 g. sodium hydroxide), cooling and stirring during the process so that the temperature does not exceed 40° C. The mixture is then made slightly alkaline by the addition of a small quantity of sodium carbonate and distilled with steam to remove the 8-hydroxy quinoline. Yield is 150° g. or 100% based on the o-aminophenol used or 67% based on both the o-aminophenol and o-nitrophenol used in the reaction.

For separation of the 8-hydroxy quinoline as the copper salt the reaction mixture is neutralized as before, which causes the precipitation of the free 8-hydroxy quinoline plus a quantity of undesirable tarry by-products. Sufficient sulfuric acid in 25% solution (42 cc. conc. sulfuric acid) is now added to the mixture so that the 8-hydroxy quinoline is dissolved leaving the tarry material largely undissolved. The mixture is now stirred and raised to a temperature of 95–100° for one-half hour, which treatment serves to coagulate the tarry material and facilitates its removal by filtration when the mixture has been allowed to cool. The amber colored filtrate will have a pH of 1.5–2.5 and is now treated with copper sulfate (130 g. $CuSO_4 \cdot 5H_2O$) in 25% solution. By addition of copper sulfate the the pH is lowered considerably and must be raised to at least 2.7 by the addition of sodium hydroxide (90 g.) in 50% solution. The copper salt is then precipitated quantitatively from the mixture as a bright green water-insoluble material. It is filtered immediately from the warm solution. Yield is 190–200 g. of material of 90–95% purity.

Example II

The procedure of Example I is repeated using 252 g. of glycerol.

From the foregoing description it will be seen that the present invention provides numerous advantages, the principal advantages being that the process of my invention enables the production of 8-hydroxy quinoline in highly improved yields by the Skraup synthesis and that my process completely eliminates the problem of controlling the violence of the reaction which has been the principal factor preventing manufacture of 8-hydroxy quinoline by the Skraup reaction on a commercial scale. Other advantages of my invention will be apparent from this description to those skilled in the art.

Having thus described my invention, what I claim and desire to protect by Letters Patent is:

1. A process for the preparation of 8-hydroxy quinoline which comprises forming a mixture of glycerol, concentrated sulfuric acid containing not more than 5 per cent by weight of water and ortho-aminophenol at a temperature of not over 120° C., gradually adding the resulting mixture while at said temperature to a mixture of ortho-nitrophenol and an inorganic oxygen carrier selected from the group consisting of compounds of iron, cobalt and nickel which are soluble in the reaction mixture, in a reaction zone at such a rate that the temperature in the reaction zone does not exceed 140° C., and thereafter continuing the reaction at a temperature of not over 140° C.

2. A process for the preparation of 8-hydroxy quinoline which comprises forming a mixture of glycerol, concentrated sulfuric acid containing not more than 5 per cent of weight of water and ortho-aminophenol at a temperature of not over 120° C. gradually adding the resulting mixture while at said temperature to a mixture of ortho-nitrophenol and ferrous sulfate in a reaction zone at such a rate that the temperature in the reaction zone does not exceed 140° C., and thereafter continuing the reaction at a temperature of not over 140° C.

3. A process for the preparation of 8-hydroxy quinoline which comprises forming a mixture of glycerol, concentrated sulfuric acid containing not more than 5 per cent by weight of water and ortho-aminophenol at a temperature of not over 120° C., gradually adding the resulting mixture while at said temperature to a mixture of ortho-nitrophenol and ferrous sulfate in a reaction zone at such a rate that the temperature in the reaction zone does not exceed 140° C., and thereafter refluxing the reaction mixture at a temperature not exceeding 140° C. until reaction is substantially complete.

4. A process for the preparation of 8-hydroxy quinoline by a modified Skraup reaction which comprises adding a previously formed mixture of glycerol, sulfuric acid containing not more than 5 per cent by weight of water and ortho-aminophenol at a temperature of from 80° to 100° C. portionwise to a mixture of ortho-nitrophenol and ferrous sulfate in a reaction zone at an initial temperature of from 100° to 120° C. at a rate such that the temperature in the reaction zone does not exceed 140° C., thereafter completing the reaction by stirring and heating at the reflux temperature for from 4 to 5 hours, and recovering 8-hydroxy quinoline from the resulting reaction mixture.

5. The process of claim 1 in which the mol ratio of glycerol to ortho-aminophenol is between 2.75:1 and 3.5:1.

6. The process of claim 1 in which the mol ratio of ortho-nitrophenol to ortho-aminophenol is substantially 0.5:1.

7. The process of claim 1 in which the mol ratio of glycerol to ortho-aminophenol is between 2.75:1 and 3.5:1 and in which the mol ratio of ortho-nitrophenol to ortho-aminophenol is substantially 0.5:1.

8. A process for the preparation of 8-hydroxy quinoline which comprises forming a mixture of glycerol, concentrated sulfuric acid containing not more than 5 per cent by weight of water and ortho-aminophenol at a temperature of not over 120° C., adding the resulting mixture while at said temperature portionwise to a mixture of ortho-nitrophenol and ferrous sulfate in a reaction zone at an initial temperature of from 100° to 120° C. in such manner that the temperature in said reaction zone does not exceed 140° C. during said addition, and thereafter maintaining the reaction mixture at the refluxing temperature until reaction is substantially complete.

9. A process for the preparation of 8-hydroxy quinoline by the reaction of glycerol, ortho-aminophenol, concentrated sulfuric acid and ortho-nitrophenol in the presence of an inorganic oxygen carrier selected from the group consisting of compounds of iron, cobalt and nickel which are soluble in the reaction mixture which comprises effecting preliminary intermixture of the glycerol, concentrated sulfuric acid containing not more than 5 per cent by weight of water and ortho-aminophenol by adding the ortho-aminophenol gradually to the concentrated sulfuric acid while maintaining the temperature at from 70° to 80° C., and then adding the glycerol gradually to the resulting mixture while maintaining the temperature at from 70° to 80° C., gradually adding the resulting mixture while at a temperature of not over 120° C. to a mixture of the ortho-nitrophenol and the inorganic oxygen carrier in a reaction zone at such a rate that the temperature in the reaction zone does not exceed 140° C., and thereafter refluxing the reaction mixture at a temperature of not over 140° C. until reaction is substantially complete.

10. A process of making 8-hydroxy quinoline which comprises forming a mixture of glycerol, concentrated sulfuric acid containing not over 5 per cent by weight of water, and ortho-aminophenol at a temperature of not over 120° C., the relative proportions ranging from 2.75 to 3.75 moles of glycerol and from 2 to 4 moles of sulfuric acid per mole of said ortho-aminophenol, gradually adding the resulting mixture while at said temperature to a mixture of from 0.4 to 0.6 moles of ortho-nitrophenol per mole of said ortho-aminophenol and ferrous sulfate in amount ranging from 5 to 20 per cent by weight based on said ortho-aminophenol in a reaction zone at a rate such that the temperature in the reaction zone does not exceed 140° C., and thereafter refluxing the reaction mixture at a temperature not exceeding 140° C. until reaction is substantially complete.

WALTER R. ASHFORD.

REFERENCES CITED

The following references are of record in the file of this patent:

UNITED STATES PATENTS

| Number | Name | Date |
| --- | --- | --- |
| 237,917 | Skraup | Feb. 15, 1881 |

FOREIGN PATENTS

| Number | Country | Date |
| --- | --- | --- |
| 727,528 | France | Mar. 29, 1932 |
| 240,991 | Switzerland | June 1, 1946 |

OTHER REFERENCES

Hollins, Synthesis of Nitrogen Ring Compounds (Van Nostrand Co., New York, 1924), page 245.

Kenner et al., Berichte, vol. 60-B, p. 16 (1936).

B. I. O. S., Final Report 1154, item No. 22, page 42 (published on March 12, 1948, as PB-80, 401.

Kochendorfer, Ueber Chinolinsynthesen mit Acroleinen (published on March 30, 1948, as PB-L-70, 332, Frames 187-207. Frames 191-196 particularly relied on).